United States Patent [19]

Suzuki et al.

[11] Patent Number: 5,378,517
[45] Date of Patent: Jan. 3, 1995

[54] OPTICAL DISC HAVING SIGNAL RECORDING LAYER ON EACH SIDE AND METHOD FOR PRODUCING SAME

[75] Inventors: Akira Suzuki; Daiki Kobayashi, both of Miyagi, Japan

[73] Assignee: Sony Corporation, Japan

[21] Appl. No.: 96,645

[22] Filed: Jul. 23, 1993

Related U.S. Application Data

[60] Continuation of Ser. No. 973,418, Nov. 9, 1992, abandoned, which is a division of Ser. No. 659,517, Feb. 21, 1991, Pat. No. 5,284,538.

Foreign Application Priority Data

Feb. 22, 1990 [JP] Japan .................................. 2-41707

[51] Int. Cl.⁶ .............................................. G11B 23/00
[52] U.S. Cl. .................................... 428/64; 428/65; 428/694 R; 428/913; 346/135.1; 369/281; 369/286
[58] Field of Search ............... 428/64, 65, 913, 694 R; 346/76 L, 135.1; 369/280, 281, 286

[56] References Cited

U.S. PATENT DOCUMENTS

| | | |
|---|---|---|
| 3,936,712 | 2/1976 | Gerber et al. |
| 4,264,911 | 4/1981 | Wilkinson. |
| 4,353,767 | 10/1982 | Wilkinson. |
| 4,357,616 | 11/1982 | Terao et al. |
| 4,358,474 | 11/1982 | Nakano et al. |
| 4,569,881 | 2/1986 | Freese et al. |
| 4,583,102 | 4/1986 | Tamura et al. |
| 4,733,388 | 3/1988 | Fujimoto et al. |
| 4,809,022 | 2/1989 | Wilkinson et al. |
| 4,915,997 | 4/1990 | Yamamuro et al. ................. 428/64 |
| 4,917,751 | 4/1990 | Ohta et al. |
| 4,954,379 | 9/1990 | Nishida et al. ........................ 428/64 |
| 4,954,380 | 9/1990 | Kanome et al. |
| 4,963,901 | 10/1990 | Wilkinson et al. |
| 5,059,462 | 10/1991 | Kurisu et al. ........................ 428/64 |

FOREIGN PATENT DOCUMENTS

0150829A1 8/1985 European Pat. Off. .

OTHER PUBLICATIONS

Patents Abstracts of Japan, unexamined applications, P field vol. 14, No. 92, Feb. 20, 1990, The Patent Office Japanese Government. *
Patent Abstracts of Japan, unexamined applications, P Field, vol. 11, No. 121, Apr. 16, 1987, The Patent Office Japanese Government. *
Patent Abstracts of Japan, unexamined applications, P Field, vol. 11 No. 91, Mar. 23, 1987, The Patent Office Japanese Government. *

Primary Examiner—Patrick J. Ryan
Assistant Examiner—Marie R. Macholl
Attorney, Agent, or Firm—Limbach & Limbach

[57] ABSTRACT

A double-side optical disc formed by a pair of optical disc halves bonded together, and a process for producing the double-side optical disc. An adhesive is applied to the disc halves, which are then bonded together at an angle relative to each other in which the direction of the adhesive flow on one disc half will intersect the direction of the adhesive flow on the other disc half. In this manner, satisfactory flatness of the optical disc may be achieved without being affected by surface irregularities of the adhesive layer.

2 Claims, 7 Drawing Sheets

OPTICAL DISC HAVING SIGNAL RECORDING LAYER ON EACH SIDE AND METHOD FOR PRODUCING SAME

This is a continuation of application Ser. No. 07/973,418, filed Nov. 9, 1992, now abandoned, which is a divisional of application Ser. No. 07/659,517, filed Feb. 21, 1991, now U.S. Pat. No. 5,284,538.

BACKGROUND OF THE INVENTION

1. Field of the Invention

This invention relates to a double-side optical disc having a recording surface for information signals on each side thereof and, more particularly, to a double-side optical disc composed of a pair of optical discs each having a signal recording surface on one side thereof and bonded to each other by an adhesive.

2. Description of the Prior Art

There has been proposed an optical disc in which data signals in the form of pits are formed by resin molding using a stamper and subsequently read out by an optical pickup.

The optical disc is constituted by a disc-shaped base material formed of a synthetic resin, such as polycarbonate, acrylic resin or epoxy resin, or glass, and a signal recording layer of, for example, a magnetic material, formed on the major surface of the disc shaped base material.

As such optical disc, there has been proposed a double-side optical disc 102 comprised of a pair of optical disc halves 101a, 101b bonded to each other as shown in FIG. 1 to enable data signals to be read and/or written from or on both major surfaces of the disc. The optical disc halves 101a, 101b of the double-side optical disc 102 are bonded together at the back sides thereof so that the front sides on the signal recording sides face to outside. The optical disc halves 101a, 101b are bonded together by applying an adhesive 103 of, for example, a rubber material, on the overall back sides thereof and pressing the disc halves together in the superimposed state.

Meanwhile, when the adhesive 103 is applied on the optical disc halves 101a, 101b for producing the double-side optical disc 102, the surface of the adhesive 103 tends present irregularities. It is because the adhesive 103 is applied by roll coating in which the adhesive is applied to the outer periphery of a rotating applicator roll and by bringing the applicator roll into rolling contact with the optical discs 101a, 101b.

Should the surface of the adhesive 103 present irregularities, the optical disc halves 101a, 101b bonded together tend to deviate from optimum smoothness due to the surface irregularities of the adhesive 103. Unless the smoothness of the optical discs 101a, 101b is maintained, the signal recording layer is deteriorated in flatness to render it difficult to write and/or read data signals on or from the signal recording layer under optimum states.

OBJECTS AND SUMMARY OF THE INVENTION

It is therefore an object of the present invention to provide a double-side disc which is produced by applying an adhesive by so-called roll coating on a pair of optical disc halves and bonding the disc halves together under pressure to maintain optimum flatness of the optical disc.

It is another object of the present invention to provide a double-side optical disc which is produced by bonding two optical disc halves together, said optical disc exhibiting flatness and satisfactory recording and/or reproducing characteristics for data signals.

It is a further object of the present invention to provide a method for reliably producing a double-side optical disc having superior flatness.

In accordance with the present invention, there is provided a double-side optical disc formed by bonding a pair of optical disc halves together by transferring an adhesive applied to the outer peripheral surface of a rotating applicator roll to the disc halves by rolling contact thereof with said rotating applicator roll, said optical disc halves being bonded together at such an angle relative to each other that the direction of rolling contact of one of the disc halves with said applicator roll intersects that of rolling contact of the other of the disc halves with said applicator roll.

With the double side optical disc formed by a pair of disc halves bonded together by an adhesive, since the disc halves are bonded together at a relative angle such that the direction in which the applicator roll has rolling contact with one of the disc halves intersects that in which the application roll has rolling contact with the Other disc half, it becomes possible to counterbalance surface irregularities on the adhesive layers applied to the disc halves to realize flatness of the signal recording layer on the optical disc.

The above and Other objects and advantages of the present invention will become more apparent from the following detailed description of the present invention especially when read in conjunction with the present invention.

DESCRIPTION OF PREFERRED EMBODIMENTS

Figure 1:
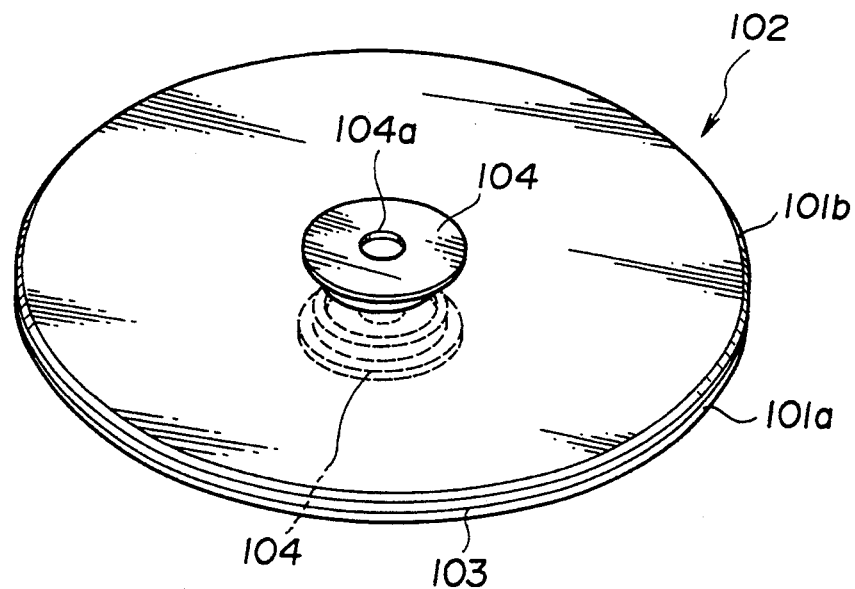
FIG. 1 is a perspective view showing the construction of a double-side optical disc.

By referring to the drawings, a preferred embodiment of the present invention will be explained in detail.

The double-side optical disc according to the present invention is prepared by bonding a pair of optical disc halves 101a, 101b as shown in FIG. 1 to each other so that data signals may be written on and/or read from both major surfaces of the disc halves. The optical disc halves 101a, 101b of the double-side optical disc 102 are bonded at the back surfaces thereof with the adhesive 103 so that the front surfaces, that is the signal recording surfaces, will face outwards.

Each of the disc halves 101a, 101b is a disc on which data signals may be recorded, and which is constituted by a disc base material which is formed into a disc shape from synthetic resin such as polycarbonate, acrylic resin or epoxy resin or glass, and a signal recording layer which is formed on the major surface of the disc base material and which is formed of a magnetic material. The signal recording layers are formed on the back surfaces of the optical discs 101a, 101b. That is, the data signals are written on and/or read from the signal recording layers by a laser light radiated from the front surfaces of the disc halves 101a, 101b and transmitted through the disc base materials of the discs halves 101a, 101b.

Disc hubs 104, 104 are secured to the disc base materials of the optical disc halves 101a, 101b. These disc hubs 104, 104 are adapted to be chucked to a disc drive device used for writing and/or reading data signals on or from the double-side optical disc 102, and are mounted at the center on the front surfaces of the base material sides of the disc. The disc hubs 104, 104 are formed of a rigid material, such as material, in the shape of a disc, and provided with a centering hole 104a used for chucking the double-side disc by the disc driving device.

The detailed structure of the double-side optical disc according to the present invention and the step-by-step process for producing the double-sided optical disc will be hereinafter explained.

Figure 2:
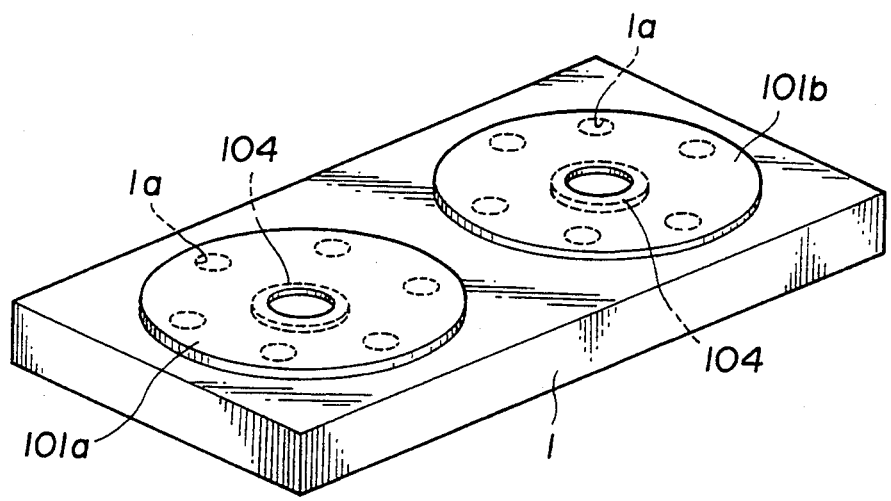
FIG. 2 is a perspective view showing the construction of a movable table for transporting a pair of optical disc halves for producing the double-side optical disc according to the present invention.

For producing the double-side optical disc, a pair of optical disc halves 101a, 101b are placed in juxtaposition on a movable table, as shown in FIG. 2. These disc halves 101a, 101b are placed on the movable table 1 so that the back surfaces thereof bearing the signal recording layers will face upwards. The movable table 1 is provided with a plurality of suction openings 1a in an area thereof supporting the disc halves 101a, 101b. These suction openings 1a communicate with an air suction hole of a vacuum pump, not shown. Thus, when the vacuum pump is in operation to draw air thereinto by means of the suction openings 1a, the optical discs 101a, 101b are sucked onto the movable table 1.

Figure 3:
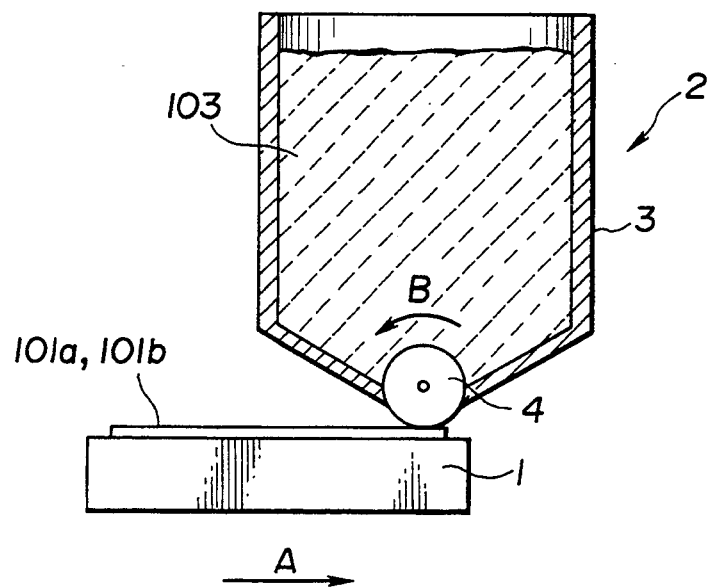
FIG. 3 is a side elevational view showing the construction of an adhesive applicator unit employed for producing the double-side optical disc.

Referring to FIG. 2, the movable table 1 is moved past the lower end of a roll-coat type adhesive applicator device 2 in the horizontal direction as indicated by an arrow A in FIG. 2. The applicator device 2 includes an adhesive reservoir 3 and an applicator roll 4 mounted within a roll mounting aperture 3a formed at the bottom side of the reservoir 3 so that the roll 4 will face both the inside of the reservoir 3 and the outside below the mounting aperture 3a. An adhesive 103 of a rubbery material, such as a so-called hot melt heated to a workable temperature, is stored in the reservoir 3. The applicator roll 4 is adapted to be rotated as indicated by an arrow B in FIG. 3 by a rotating device, not shown, and is mounted with its rotational axis parallel to the upper surface of the movable table 1. As the applicator roll 4 is rotated, the adhesive 103 stored in the reservoir 3 is applied on the outer periphery of the roll 4.

The optical disc halves 101a, 101b, placed on the movable table 1, are transported by the movable table 1, as it is contacted with the coating roll 4 coated with the adhesive 103. Since the roll 4 is kept rotating, it is slidingly contacted with the disc halves 101a, 101b. The adhesive 103, applied on the outer periphery of the roll 4, is transferred to the back surfaces of the optical disc halves 101a, 101b. Thus the adhesive 103 has been applied to the overall surface of the optical disc halves 101a, 101b emerging from the lower end of the applicator device 2, as shown in FIG. 4.

Figure 4:
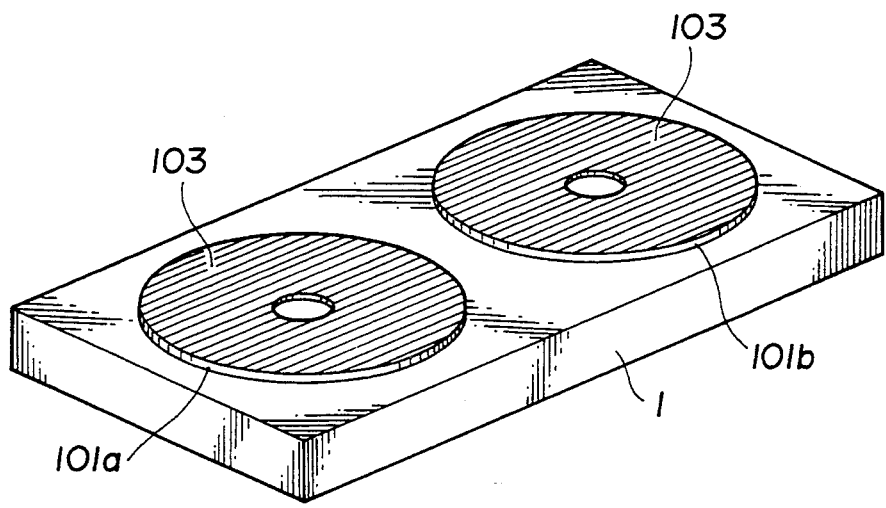
FIG. 4 is a perspective view showing a pair of optical disc halves to which the adhesive has been applied by the adhesive applicator unit.
Figure 5:
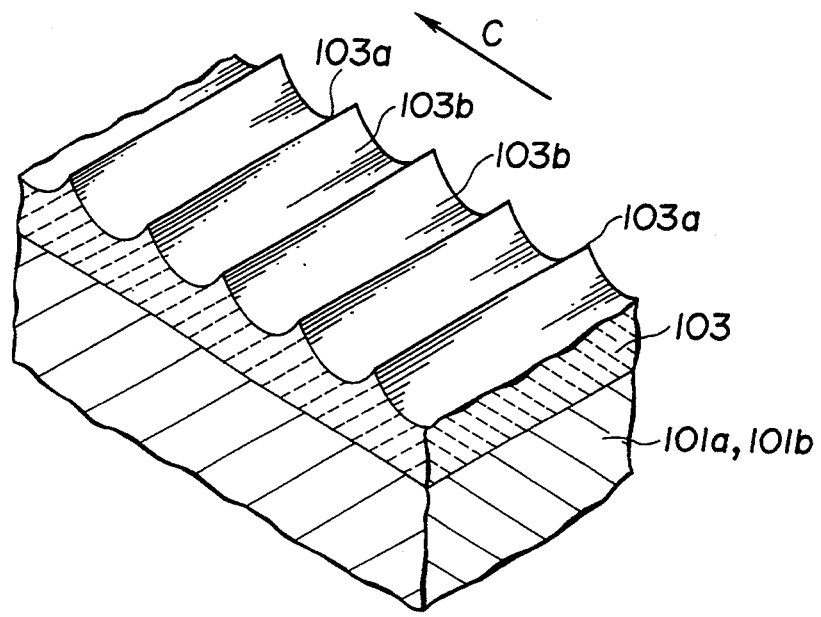
FIG. 5 is a partial perspective view illustrating the state of the adhesive applied to the optical disc.

The surface of the adhesive 103, thus applied to the optical discs 101a, 101b, presents irregularities, as shown in FIG. 4, formed by projections 103a and recesses 103b extending at substantially right angles to the direction in which the applicator roll 4 has had the rolling contact with the optical disc halves 101a, 101b, that is the direction of relative movement between the roll 4 and the optical disc halves 101a, 101b, so shown by an arrow C in FIG. 5, owing to the fact that the adhesive 103 is coated on the optical disc halves 101a, 101b as it is stretched between the roll 4 and the optical disc halves 101a, 101b due to the viscosity proper to the adhesive 103.

Figure 6:
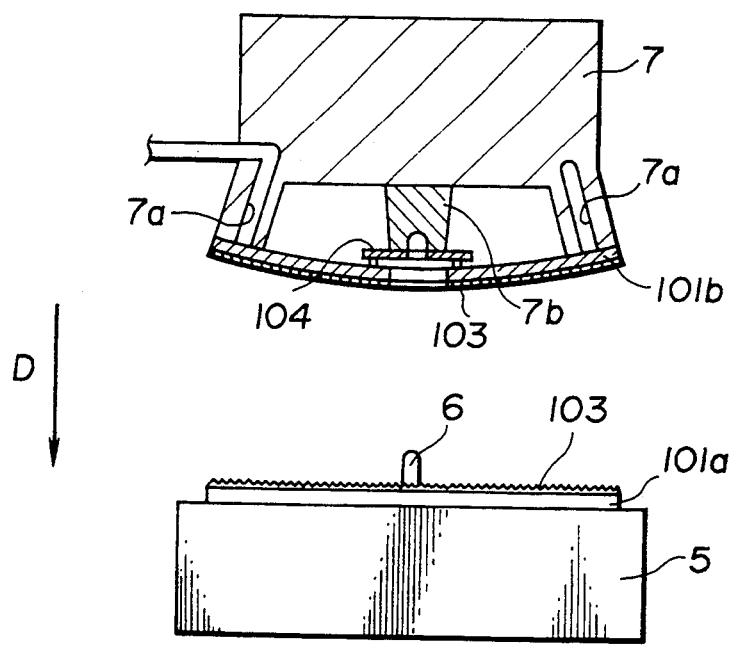
FIG. 6 is a side elevational view, shown partially in cross-section, and showing a base block and a deforming/retaining device employed for producing the double-side optical disc.

One 101a of the optical disc halves 101a, 101b in then placed on the base block 5, as shown in FIG. 6, with the back surface thereof facing upwards, as shown in FIG. 6. A positioning pin 6 is implanted on the base block 5. The optical disc half 101a is mounted in position on the base block 5 with the positioning pin 6 passed through the centering hole 104a.

The Other 101b of the optical disc halves 101a, 101b, is held in position above the block 5 by a deforming-/retaining device 7, as shown in FIG. 6, so that the back side of the optical disc half 101b faces the optical disc half 101a placed on the base block 5. The deforming-/retaining device 7 has a peripheral suction hole 7a communicating with a vacuum pump and adapted for holding the peripheral area of the optical disc half 101b and a central pressor member 7b for pressing and supporting the central area of the optical disc half 101b. Thus the optical disc 101b is supported in the deformed state by the deforming/retaining device 7 as it has its peripheral region retained by the device 7 under suction and is pressed downwards at its center so that the middle section on the back surface of the optical disc half 101b is swollen downwards.

The deforming/retaining device 7 is then rotated by, for example, about 90 degrees about the central vertical axis of the optical disc half 101b, so that the direction along which the applicator roll 4 has had sliding contact with the optical disc half 101a and that along which the applicator roll 4 has had rolling contact with the optical disc half 101b intersects each other.

Figure 7:
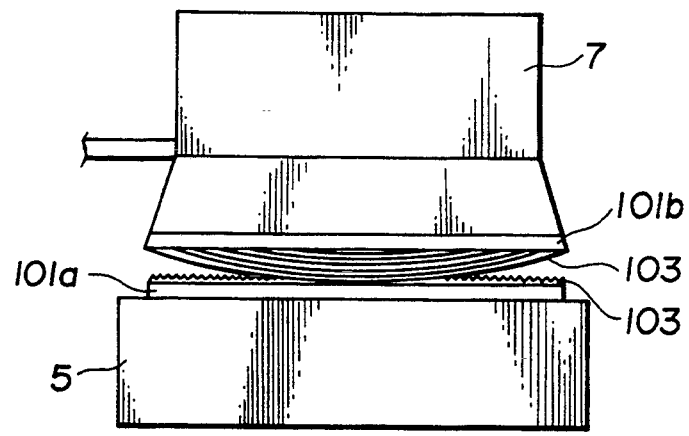
FIG. 7 is a side elevational view, shown partially in cross-section, and showing the state in which the base block approaches the deforming/retaining device.

The deforming/retaining device 7 is then moved in a direction towards the block 5, as shown by an arrow D in FIG. 6, so that the optical disc halves 101a, 101b are stacked one upon the other, with the back surfaces thereof facing each other with the adhesives 103 in between. At this time, since the optical disc half 101b, held by the deforming/retaining device 7, has been deformed so that the middle portion thereof is swollen downwards, the adhesive 103 applied at the middle portion of the optical disc half 101a and the adhesive 103 applied at the middle portion of the optical disc half 101b are first contacted with each other, as shown in FIG. 7, with the contact area then proceeding gradually toward, the outer peripheries of the optical disc halves 101a, 101b. With the optical disc halves 101a, 101b being overlapped in this manner with each other, air bubbles in the adhesive 103 applied on the optical disc halves 101a, 101b are expelled towards the outer peripheries of the optical disc halves 101a, 101b.

Figure 8:
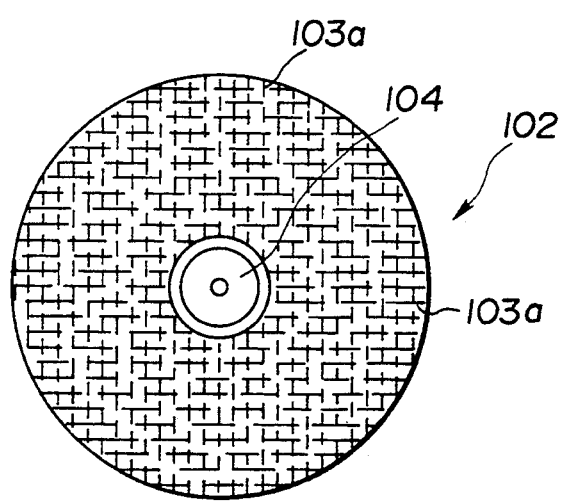
FIG. 8 is a plan view of a double-side optical disc constituted by bonding the disc halves together.

The optical disc halves 101a, 101b are then bonded together under a pressure of, for example, about 1 ton applied from a press, not shown. At this time, the optical disc halves 101a, 101b are placed relative to each other with the direction of rolling contact of the optical disc half 101a by the roll 4 intersecting that of rolling contact of the optical disc half 101b by the roll 4, that is, with the direction of the projections 103a of the adhesive 103 on the optical disc half 101a intersecting that of the projections 103a of the adhesive 103 on the optical disc half 101b, as shown by dotted and chain dotted lines in FIG. 8. Thus the irregularities on the surface of the adhesive 103 applied on the optical disc half 101a, are counterbalanced by those on the surface of the adhesive 103 applied on the optical disc half 101b to prevent the surface irregularities on the surface of the adhesive 103 from affecting the flatness of the optical disc halves 101a and 101b.

Figure 9:
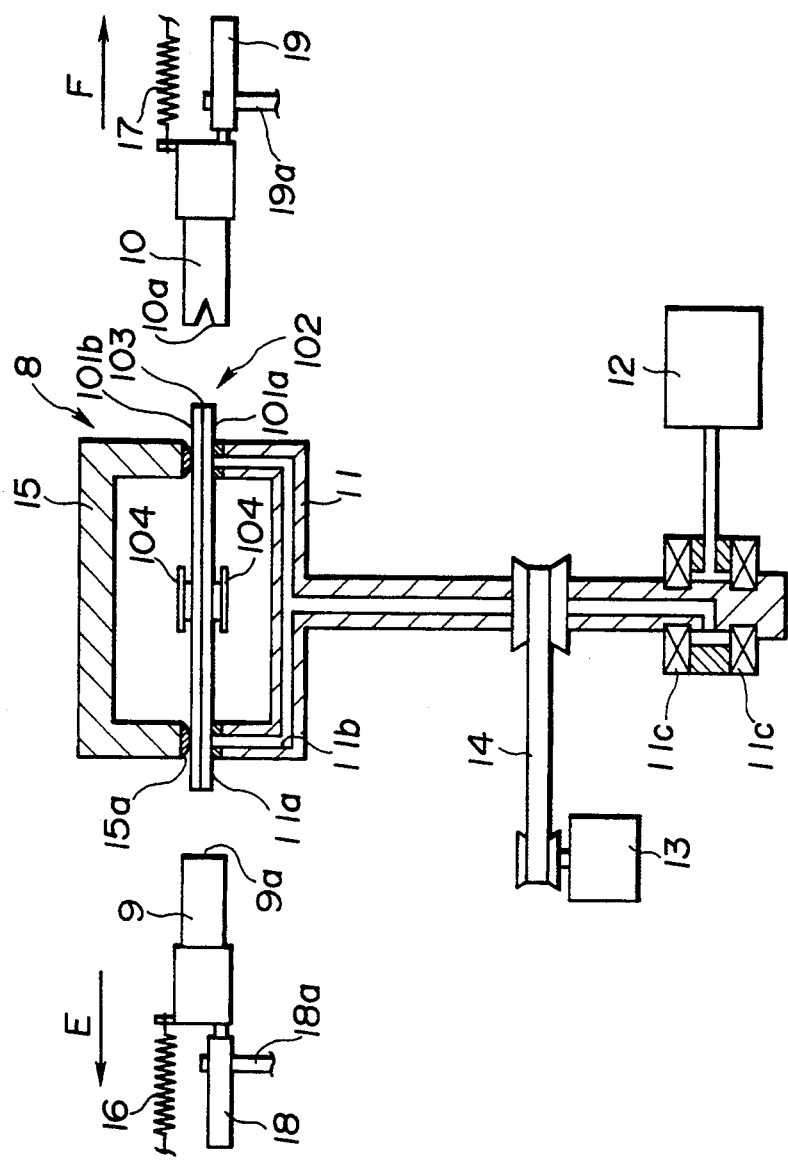
FIG. 9 is a side elevational view, shown partially in cross-section, and showing the construction of the rotating/retaining device and the cutting tools employed for producing the double-side optical disc.
Figure 10A:
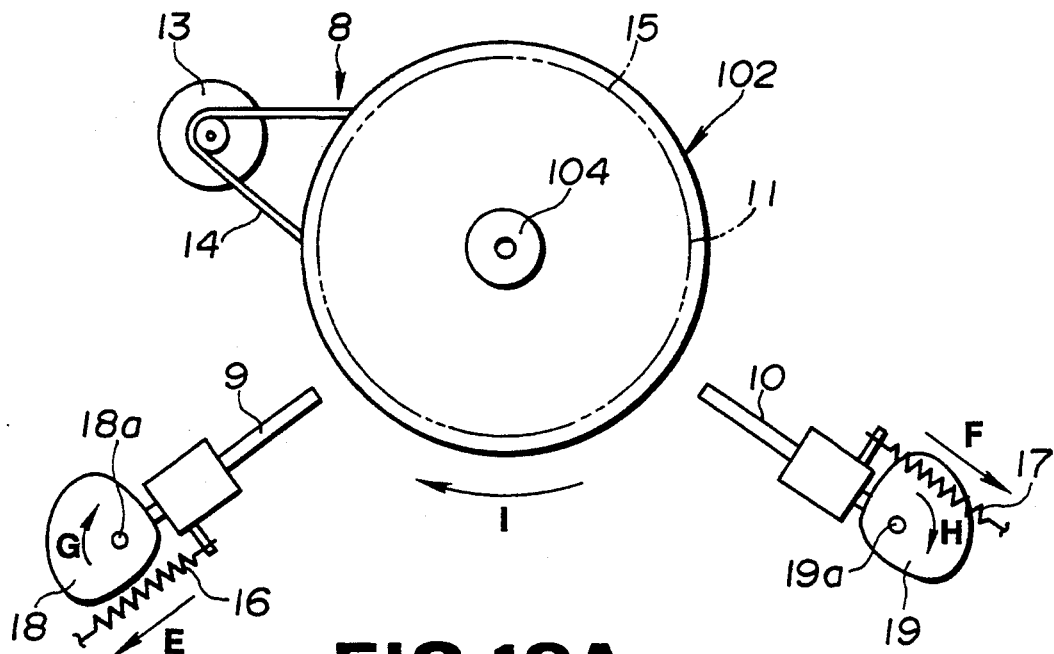
FIG. 10A is a plan view showing the construction of the rotating/retaining device and the cutting tools.
Figure 10B:
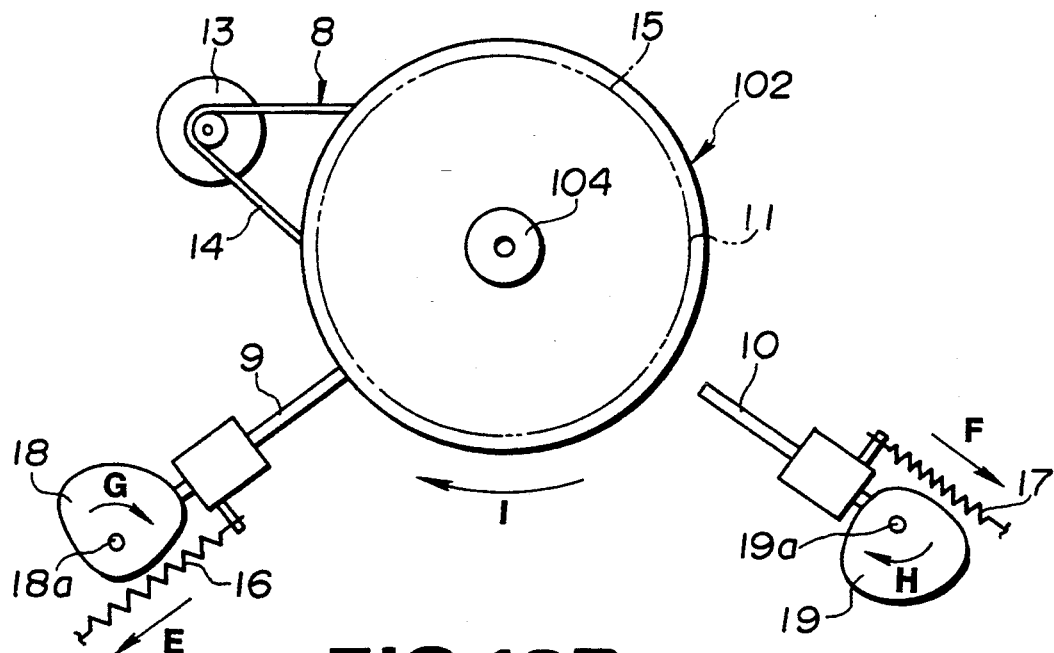
FIG. 10B is a plan view showing the state of the rotating/retaining device and the cutting tools when the rotary cams for advancing the cutting tools have been rotated by 90 degrees.
Figure 10C:
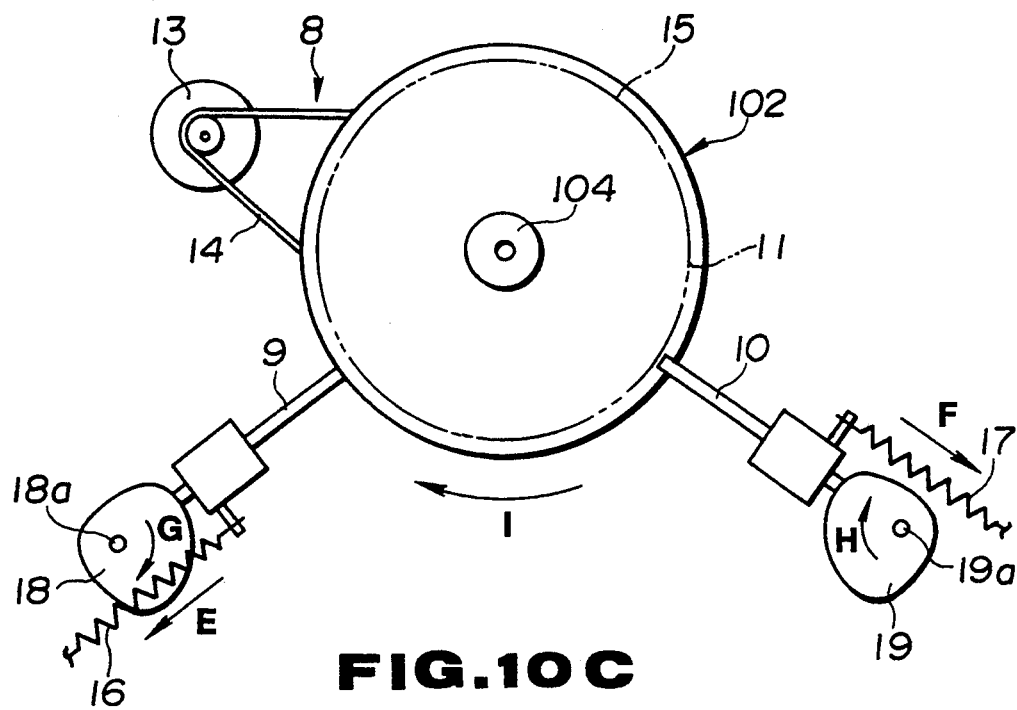
FIG. 10C is a plan view similar to FIG. 10B when the rotary cams for advancing the cutting tools have been rotated further by 90 degrees from the state shown in FIG. 10B.
Figure 10D:
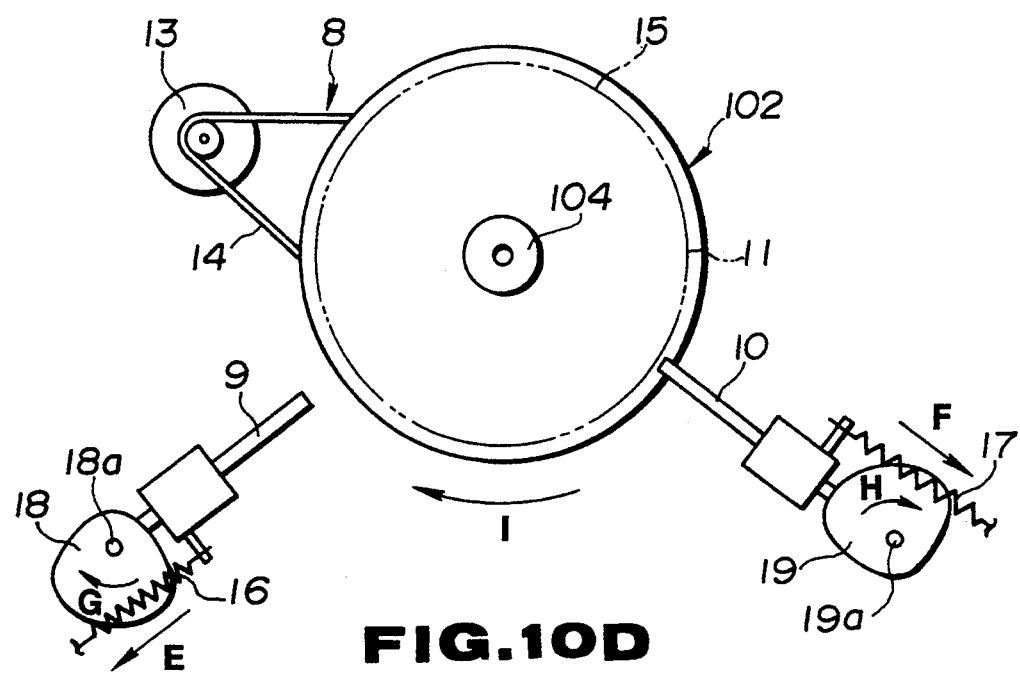
FIG. 10D is a plan view similar to FIGS. 10B and 10C when the rotary cams for advancing the cutting tools have been rotated further by 90 degrees from the state shown in FIG. 10C.

The double-side optical disc 102, thus formed by bonding the optical disc halves 101a and 101b to each other, is machined on its outer periphery. To this end, the disc 102 is rotated about its axis as it is held by a rotating/retaining device 8, as shown in FIG. 9, and has its outer periphery machined by first and second cutting tools 9 and 10 kept in contact with the outer periphery of the rotating disc 102.

The rotating/retaining device 8 includes a rotary table section 11 adapted for supporting the double-side optical disc 102 thereon and rotatably supported by a pair of bearings 11c. The rotary table section 11 includes a circular rest section 11a for supporting the outer periphery of the double-side optical disc 102. The rest section 11a is formed of an elastic material, such as silicon rubber. The rest section 11a is provided with a suction bore 11b communicating with a suction port of a vacuum pump 12. Thus, when the vacuum pump 12 is in operation to draw in air by means of the suction bore 11b, the double-side optical disc 102 is sucked onto the rest section 11a. The rotary table section 11 is adapted to be rotated by a driving electric motor 13 by means of an endless driving belt 14 at a constant velocity of say 900 to 1200 revolutions per minute.

The rotating/retaining device 8 also includes a presser member 15 facing the rotary table section 11 and adapted to be supported by and pressed against the rest section 11a of the rotary table section 11. The presser member 15 has a circular presser section 15a in register with the rest section 11a. Thus the double-side optical disc 102 is rotated in the rotating/retaining device 8 as it has its outer peripheral region clamped and held by the rest section 11a and the presser section 15a.

The first cutting tool 9 is of a flat type and is supported for movement towards and away from the double-side optical disc 102 with a flat edge section 9a facing the outer periphery of the double-side optical disc 102 held by the rotating/retaining device 8. The first cutting tool 9 is normally biased by a first biasing spring 16 in a direction away from the optical disc 102 sown by an arrow E in FIGS. 9 and 10.

The second cutting tool 10 is of a vee type and is supported for movement towards and away from the double-side optical disc 102 with a vee edge section 10 facing the outer periphery of the disc 102 held by the rotating/retaining device 8. The second cutting tool 10 is biased by a second biasing spring 17 in a direction away from the double-sided optical disc 102 as shown by an arrow F in FIGS. 9 and 10.

The first and second cutting tools 9 and 10 are moved with a time difference relative to each other towards the double-side optical disc 102 at the rate of several millimeters per second, against the bias of the biasing springs 16 and 17, by first and second rotary cams 18 and 19 rotated unidirectionally at a constant velocity as shown by arrows G and H in FIG. 10.

Thus, when the disc 102 is rotated by the rotating-/retaining unit 8 and the first and second rotary cams 18 and 19 have been rotated by about 90 degrees, the first cutting tool 9 is moved by the first rotary cam 18 towards the double-side optical disc 102 as shown at B in FIG. 10. Thus the edge section 9a of the first cutting 9 is brought into contact with the outer periphery of the double-side optical disc 102 to cut the outer periphery of the disc 102 to a cylindrical contour.

When the first and second rotary cams 18 and 19 have been rotated further by 90 degrees, the cutting by the first cutting tool 9 has nearly been completed, as shown in at C FIG. 10, and by means of the second rotary cam 19, the second cutting tool 10 is moved towards the double-side optical disc 102. Thus the edge section 10a of the second cutting tool 10 is brought into contact with the outer periphery of the double-side optical disc 102 to chamber the upper and lower edges on the outer periphery of the double-side optical disc 102.

When the first and second rotary cams 18 and 19 have been rotated further by 90 degrees, the first cutting tool 9 is reset to the initial state, while the cutting by the second cutting tool 10 has nearly been completed, as shown at D in FIG. 10. When the rotary cams 18 and 19 have been rotated further by 90 degrees, the second cutting tool 10 is reset to the initial state shown at A in FIG. 10, while the cutting of the outer periphery of the optical disc 102 is completed.

The double-side optical disc 102, having its outer periphery retained by the rotating/retaining device 8 and cut by the first and second cutting tools 9 and 10, may be machined to a predetermined outside diameter within the tolerance of say ±0.2 mm.

What is claimed is:

1. A double-sided optical disc comprising:
   a first optical disc having a first side and a second side, the first optical disc including a first signal recording layer;
   a second optical disc having a first side and a second side, the second optical disc including a second signal recording layer;

a first adhesive layer affixed to the second side of the first optical disc, the first adhesive layer including a plurality of parallel alternating projections and recesses; and a second adhesive layer affixed to the second side of the second optical disc, the second adhesive layer including a plurality of parallel alternating projections and recesses, the projections of the first adhesive layer bonded to and intersecting the projections of the second adhesive layer, wherein the angle between the projections of the first adhesive layer and the projections of the second adhesive layer is substantially equal to 90 degrees.

2. The double-sided optical disc of claim 1 wherein the first and second signal recording layers further comprise:

magnetic material.

* * * * *